United States Patent Office 2,802,800
Patented Aug. 13, 1957

2,802,800

POLYVINYL ESTER RESIN PLASTICIZED WITH AN EPOXY STEARIC ACID ESTER

Francis J. Sprules, Caldwell, and Henry C. Marks, Glen Ridge, N. J., assignors to Wallace & Tiernan, Incorporated, Bellville, N. J., a corporation of Delaware No Drawing. Application June 8, 1953,
Serial No. 360,355

1 Claim. (Cl. 260—30.4)

For the plasticization of polyvinyl resin and other compositions, i. e. to reduce the inherent hardness or brittleness of polyvinyl resins and to yield products that are stable, supple and mechanically strong, a suitable agent should not only serve its primary function as a plasticizer, but should also have characteristics of permanence and be free of deteriorating influence on the resin. Similar requirements apply to plasticizers for other materials such as polyvinylidene chloride resins and copolymers of this vinyl derivative with polyvinyls, and likewise materials such as chlorinated rubbers and chlorinated paraffins. Hence a general object of the present invention is to provide improved resin or plastic compositions of the various foregoing types, plasticized with agents of a new class described below; indeed such agents appear useful for plasticizing any of a considerable variety of resins or the like. With reference, however, to a particularly important aspect of the invention, it has been demonstrated that the new plasticizing agents are of unusual and unexpected advantage, i. e. in contrast to plasticizers heretofore employed, for polyvinyl resins. A chief specific object is therefore to provide improved compositions of the latter type.

As indicated above, these polymeric materials, and particularly the resins made from polyvinyl compounds such as the chloride or acetate or mixtures of same, require a plasticizing agent with a number of special properties which have been collectively difficult to find. For example, the plasticizer must have complete compatibility with the resin so that it does not ooze or leak or sweat out of the sheet or other form in which the resin or plastic is embodied. For permanence of retention, the agent should be non-volatile and likewise incapable of being readily washed out by water. Manifestly, the plasticizer should not in any way contribute to instability of the polyvinyl composition, i. e. so as to promote cracking, discoloration or the like; indeed it is desirable, if possible, to have the plasticizer assist in preventing such reactions. The present invention is therefore designed to afford improvement in plasticized resin compositions of the described type, by the provision of new plasticizing agents that more effectively or completely satisfy these requirements and purposes than the substances heretofore employed.

In the past, for example, esters of dibasic acids, such as phthalic acid and sebacic acid, have been commonly used as plasticizers. These esters are in general excellent plasticizers and the best of them exhibit excellent characteristics of permanence. However, they do not contribute any substantial stabilizing action to the resin composition. In some respects considerable improvement has been achieved by the use of a certain group of esters of epoxy fatty acids, e. g. methyl, butyl, capryl, benzyl and like esters of such acids. These compounds are non-volatile, and are effective in the function of plasticizing the resin, e. g. in conferring flexibility, suppleness and like qualities to the ultimate resin or plastic.

It has also been found that the above-mentioned epoxy esters contribute to the stability of the plastic, i. e. in tending to prevent brittleness or discoloration which may otherwise occur under certain conditions. Specifically, the epoxy group has the property of reacting with hydrochloric acid (HCl). Most polyvinyl resins contain a large or at least a significant proportion of polyvinyl chlorides. An important decomposition reaction of these polymers resides or results in the liberation of HCl under the influence of light and heat, with consequent discoloration and brittleness of the resin. It also appears that the liberated HCl then tends to catalyze additional decomposition. When an epoxy ester plasticizer, however, is used, the epoxy group reacts with the hydrochloric acid, and by thus binding the HCl, prevents it from attacking the resin and from promoting further decomposition.

While the epoxy esters mentioned above or otherwise heretofore proposed are presumably capable of the effects just described, they have been found to suffer an important disadvantage. When the epoxy group reacts with HCl it is converted to a chlor hydroxy ester, i. e. a molecular arrangement wherein one of the two carbons formerly involved in the epoxy ring now carries a hydroxyl group while the other of such carbons carries a chlorine group. As a result, the compounds, to which the described epoxy esters are thus converted, exhibit a definite decrease in compatibility with the polyvinyl resin. That is to say, the chemical groups which in eeffct takes the place of the epoxy ring appear to have less affinity for the resin material than the epoxy group itself so that there is increase in the tendency of the plasticizer to leak or sweat out as the resin article ages. Indeed many of the previously proposed epoxy esters are very close to the limit of compatibility even prior to any reaction with hydrochloric acid, and some, such as capryl epoxy stearate, tend to exhibit sweating before decomposition can take place at all. In consequence, the adverse effect of resin decomposition on compatibility of the plasticizer is likely to be manifested promptly, and in practical result, the stabilizing function of the plasticizer tends to be somewhat nullified by the loss of such agent.

The present invention involves the discovery that the difficulty of non-compatibility or of decrease in compatibility can be avoided by employing a specific, different class of epoxy esters, not heretofore used or suggested for the purpose of plasticizing polyvinyl resin compositions. Specifically, it has now been found that by using alcohols of certain molecular structure and characteristics in making the epoxy esters, the resulting compounds represent a definite, new class of plasticizing agents which do not suffer the foregoing defects and which are entirely satisfactory in all other respects. The compounds are efficient plasticizers for polyvinyl resins and have appropriate non-volatility, resistance to water, and compatibility with the plastic, while cooperating to promote stability of the resin without undergoing deterioration of their own properties.

In an important specific sense, the invention comprises plasticized polyvinyl resin compositions wherein the plasticizer is an epoxy ester of the class defined as follows. The acid part of the ester consists of a fatty acid containing from 16 to 22 carbon atoms (i. e. at least 16 and not more than 22) and carrying an epoxy group. The fatty acid part of the ester may be further defined as derived from one or more unsaturated fatty acids, each of which has the prescribed number of carbon atoms (i. e. in the stated range), it being understood that in its epoxy state as embodied in the ultimate ester, the unsaturated acid has had its unsaturated group converted to an epoxy group. It is permissible, however, to have present in the plasticizing agents small proportions of fatty acids, e. g. in similarly esterified form, which originally contained more than one unsaturated group but in which only one of the unsaturated linkages has been epoxidized. For example, where oleic acid in its usual commercial form is employed to make the plasticizer (by esterification and epoxidation, as described below), minor quantities of other fatty acids are also ordinarily present, including a small amount of linoleic acid, which has two unsaturated linkages. Since linoleic acid is not fully epoxidized by the usual procedure, the desired ester made from commercial oleic acid has an iodine number greater than zero, showing the presence of some unsaturation; in small percentages, as in the above example, this condition can be permitted.

The alcohol part of the ester is an alcohol containing from 3 to 12 carbon atoms (i. e. not less than 3 and not more than 12) and also having, in addition to the single ester linkage to the epoxy fatty acid, one group (and one only) selected from the class consisting of ether, ester and ketone groups. Thus considered in its status as an alcohol prior to the esterification, this portion of the epoxy ester of the invention may be further defined as a monohydroxylic aliphatic alcohol containing no unsaturation. As indicated, it must have (or must acquire), in addition to the OH group to be esterified, an ether group, an ester group, or a ketone group, but not more than one such. For example, if two ether groups are present or there are both an ether group and an ester group (in addition to the ester linkage to the epoxy fatty acid), the water solubility of the compound becomes too great and it is too easily washed out of the resin to be satisfactory.

By way of preliminary example, a particularly effective plasticizing agent of the described new class is the ester constituted by epoxy stearic acid and the monobutyl ether of ethylene glycol. It will be understood that plasticized resin compositions are made by suitably mixing the plasticizer, i. e. the last-mentioned ester or any other of the stated class, with the desired vinyl polymer or mixture of such polymers. The resin and plasticizer mixture is then appropriately treated, usually with heat and pressure, to form it to the desired article, e. g. sheet, strip, plate, or molded body. The resulting products are found to be particularly satisfactory, both in the physical properties of the resin and in the avoidance of deterioration or separation of the plasticizer.

While epoxy esters of the described class may be made in any convenient way, one effective method is first to form the ester of the selected alcohol and the selected unsaturated acid, and then to convert the unsaturated group in the acid portion to an epoxy group, all by procedures of well known character. That is to say, the unsaturated fatty acid which is capable of conversion to the desired epoxy acid is selected and is esterified by reaction with the selected alcohol, i. e. by treatment in well known manner appropriate for the formation of these or other esters of long chain fatty acids. The reaction product, which is the ester of the unsaturated acid, is then treated to convert the unsaturated group to an epoxy group, by reaction with hydrogen peroxide, peracetic acid or other per acids, again in accordance with methods which are well known and need not therefore be described in detail here.

It is generally preferable to control or continue the last-mentioned reaction so that the ester is substantially all epoxidized, inasmuch as the advantages of the invention depend on the use of the specified epoxy esters as plasticizing agents. Good results may nevertheless be obtained in many cases where there may still be present some amount, preferably no more than a minor amount, of ester material which is free of epoxy groups. For instance when the unsaturated acid is selected as a commercial type of oleic acid that may contain some quantities of other acids such as stearic acid and palmitic acid (in addition to a small amount of linoleic acid as explained above), the ester composition formed by esterification with the selected alcohol will contain a mixture of esters of the several acids originally present, the oleic ester preferably predominating. Since stearic and palmitic acids contain no unsaturated groups, their esters will not form epoxy compounds; hence to the extent that esters of saturated acids such as stearic and palmitic are present, the ultimate epoxidized compound or compounds will be accompanied by some ester material which is free of epoxy groups. The amount of non-epoxidized ester is preferably minor relative to the epoxy compound, say equal to less than 15% of the latter; in such cases there is usually no appreciable detriment in using the mixture as plasticizing agent in polyvinyl resin bodies.

It will be understood that under established nomenclature, the designation of the epoxy acid which in effect constitutes the acid part of an epoxy ester as described herein, is conveniently taken from the name of the corresponding unepoxidized acid that is saturated or that has no more unsaturated linkages than occur in the actual epoxidized acid portion. For instance, the epoxy ester, very useful in the present invention, which is produced by reaction of monobutyl ether of ethylene glycol with oleic acid and by subsequent epoxidation, is denominated the ester of epoxy stearic acid. Likewise, the substance produced (often simultaneously as explained above) from linoleic acid by esterification and partial epoxidation is an ester of epoxy oleic acid.

Specific instances of epoxy esters representing the new class of plasticizing agents may be conveniently described by reference separately to the alcohols and acids of which the compounds are in ultimate effect constituted, it being apparent that there is no special problem in either the esterification or the epoxidation steps of making these compounds, such steps being in themselves well known and the compounds themselves being not here claimed per se. Thus one particularly advantageous type of alcohol that may be used is a monoether of a glycol, especially ethylene glycol, examples of such monoethers being the monobutyl ether ($C_4H_9OCH_2CH_2OH$) and the monoethyl ether ($C_2H_5OCH_2CH_2OH$). These alcohols each contain one ether linkage, in addition to the ester linkage to the epoxy fatty acid in the ultimate compound.

Another type of alcohol, which similarly involves a single ether linkage but here as part of a cyclic structure, is tetrahydrofurfuryl alcohol:

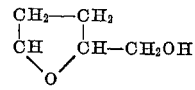

Instances of alcohols involving a single ester group (in addition to the ester linkage to the epoxy fatty acid) are the monoesters of ethylene glycol, such as the monoacetate:

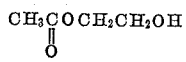

Other examples of suitable alcohols containing a single ester group are methyl glycollate, and esters of lactic acid. Use may also be made of monoethers or monoesters of higher glycols such as propylene glycol or 1,2 butylene glycol. Alcohols of a third type suitable for making the present plasticizing agents are those containing a ketone group, examples of such alcohols being acetol ($CH_3COCH_2OH$) and ethyl ketol.

Considered in the epoxidized state, as indicated by the above example of epoxy stearic acid, the acid portion of the ester may be constituted by any member of the stated range of the fatty acid series, for example from epoxy palmitic acid to epoxy behenic acid, both inclusive. Where these are derived (as explained) by epoxidation of the ester of a corresponding unsaturated acid, the last-mentioned acid is selected from those having appropriate content of carbon atoms, and containing unsaturation of the double bond type (i. e. at least one such double bond), for instance as in the case of the olefine acids in the series extending from hypogeic acid to cetoleic acid (both inclusive), including the various isomeric forms of the acids in this series. Resulting compounds containing 2.5 to 5.0% epoxy oxygen seem particularly suitable. The structure of the compounds is further illustrated by the formula (as follows) of the ester of epoxy stearic acid and the monobutyl ether of ethylene glycol, which is an outstanding example of the new plasticizing agents and which may be designated ethylene glycol monobutyl ether epoxy stearate or alternatively epoxy stearoyl ethylene glycol monobutyl ether:

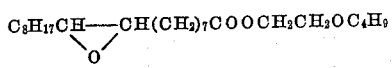

When this compound is made directly from commercial oleic acid, which usually contains about 7–12% saturated acids such as stearic and palmitic and about 4–12% of unsaturated acid or acids such as linoleic, the product is nevertheless very useful as a plasticizer although it is actually a mixture of esters of epoxy stearic acid (in large preponderance) and of other acids, especially stearic, palmitic and epoxy oleic.

Other examples of epoxy esters in the novel class of plasticizers, each of which is similarly capable of embodiment in polyvinyl resin compositions or other plastic materials for plasticization thereof, e. g. upon being incorporated in proportions such as stated elsewhere herein, are as follows:

Ethylene glycol monoethyl ether epoxy stearate
Tetrahydrofurfuryl epoxy stearate
Epoxystearoyl methyl glycollate
Epoxystearoyl butyl glycollate
Epoxystearoyl butyl lactate
β-Acetoxy ethyl epoxy stearate
Propylene glycol monomethyl ether epoxy stearate
Butylene glycol monoethyl ether epoxy stearate
Acetomethyl epoxy stearate
Propiomethyl epoxy stearate
Ethylene glycol monoethyl ether epoxy behenate
Ethylene glycol monoethyl ether epoxy arachidate
Ethylene glycol monobutyl ether epoxy palmitate In general, unusually satisfactory results appear indicated where the alcohol portion of the ester is a monoether of a glycol, most preferably ethylene glycol, of which the monobutyl ether is at present deemed of special preference. Epoxidized acids containing 18 carbon atoms appear notably desirable, present preference being thus for epoxy stearic acid and the ester of present choice being as mentioned above, ethylene glycol monobutyl ether epoxy stearate.

The epoxy esters of the described class may be used in a plastic composition, i. e. a polyvinyl resin, as the sole plasticizing ingredient or in combination with other plasticizing agents. They may be present in amounts as small as 5% of the total weight of the resin combination, or as much as 50% or more, depending (as will be understood by those skilled in the art) on the nature of the other ingredients and particularly on the presence or absence of other plasticizers. For instance, where epoxy ester material of the present class constitutes essentially the sole plasticizing agent, it may conveniently amount to 30 to 35% of the total resin formulation. It will be understood, however, that the references herein to resin compositions plasticized with an ester of an epoxy fatty acid (of the described new class) mean to include resins plasticized in part by such a substance, and likewise mean to include compositions plasticized by a mixture of such esters, each coming within the defined category. In fact, where the fatty acid material utilized for making the epoxy ester comprises, as may often occur, a mixture of unsaturated fatty acids within the defined series, the ultimate epoxidized ester material will constitute a mixture of the desired epoxy esters, such situations being understood, for convenience of definition herein, to be comprehended by reference simply to an epoxy ester (i. e. as if a single compound) of the stated category.

In making up the plasticized composition, conventional methods are advantageously employed. For instance, the epoxy ester plasticizer can be mixed with the selected vinyl polymer or polymeric mixture, such as a mixture of polyvinyl acetate and polyvinyl chloride, by milling the materials together on steam heated rolls. The mixture is then formed, usually by means of heat and pressure, into the desired sheet or other shape, as by rolls, molds or other conventional equipment. Past experience has indicated that decomposition of the vinyl polymers has frequently been initiated in the mixing and forming stages, at the elevated temperatures and pressures. Small amounts of hydrochloric acid produced at this time are capable of starting an auto-catalytic reaction (e. g. as explained above) which will subsequently impair the stability of the formed resin product. The present, new class of epoxy plasticizers has been found to have unusually great value in this respect, i. e. in counteracting even this initial decomposition, or particularly in preventing continuance of decomposition and progressive instability.

As indicated, the polyvinyl material itself may vary in composition in considerable manner, indeed to the extent known and used in the art. Hence in view of the essential simplicity of the procedure of making the polyvinyl compositions, e. g. within the directions generally indicated above, there is no need to recite here a large number of specific examples of such products. However, the following may be noted as representative:

*Example I*

A plastic composition, i. e. a resin having a content and character of polymeric material such as frequently used, may be made in plasticized form pursuant to the present invention, with the following formula (percentages or parts here and elsewhere being by weight): 63% polyvinyl resin containing 90% polyvinyl chloride and 10% polyvinyl acetate; 35% ethylene glycol monobutyl ether epoxy stearate (as plasticizer), which contains 3.5% epoxy oxygen; and 2% of suitable metallic stearate stabilizer, e. g. in accordance with known practice.

*Example II*

Another plasticized composition according to the invention may be identical with Example I, except that the epoxy ester plasticizer is constituted, as 35% of the total mixture, by tetrahydrofurfuryl epoxy stearate, having 3.7% epoxy oxygen.

*Example III*

Another effective, plasticized composition has the same content of polyvinyl resin and stabilizer as in Example I, but is plasticized with 35% ethylene glycol monoethyl ether epoxy stearate, containing 4.1% epoxy oxygen.

As indicated, the proportions of the polyvinyl esters, e. g. chlorides and acetates, may be varied, or single polymeric compounds may be employed. Likewise, depending on the results desired, the amounts of the novel plasticizer may be considerably varied, with or without the addition of supplemental plasticizing agents such as of types heretofore used. In all cases, the compositions is appropriately mixed and formed to the desired shape, and where all or a substantial part of the plasticizing function is achieved with agents of the present type, remarkably improved results have been attained. The resin product has the desired qualities of suppleness and strength, and of flexibility (if wanted), and exhibits remarkable stability over long periods of time, regardless of exposure to light, heat or the like. The epoxy plasticizers are non-volatile, are not dissolved out by water, and exhibit no sweating or leaking over long intervals.

By way of notation of specific test results, it is found that when the resin products from the foregoing examples are heated for two hours at 350°, there is, of course, some little discoloration observable, regardless of the plasticizer employed; but it is only slight (as compared with the dark brown color on heating resins made with common plasticizers such as dioctyl phthalate) and is unaccompanied by adverse effects. For instance, in the case of the esters made with ethylene glycol monoethers (Examples I and III), a very slight yellow color may be noticed, the original resin having been essentially colorless. With the composition of Example II, slightly more color is produced. Extensive investigation, however, fails to reveal that these or any other of the new epoxy plasticizers exhibit any sweating or leaking out, e. g. in the above rather severe tests of heating, or at later times or under other conditions.

In contrast, like compositions in which the plasticizer is of previously known character, for instance capryl epoxy stearate, exhibit considerable sweating under the same circumstances, i. e. even at the outset. It will be appreciated that the degree of sweating, i. e. with prior plasticizers, increases as the resin article or product ages, and as it is exposed to sunlight or other conditions that induce decomposition. With the present class of epoxy compounds, there is little or no leaking of the plasticizer over very long periods of time, even though it may have undergone reaction, e. g. with hydrochloric acid as explained above, in countering decomposition of the resin. The compounds appear particularly effective, presumably by the stated mechanism, in promoting stability of the formed resin products.

It is to be understood that the invention is not limited to the specific procedures and compounds herein particularly described, but may be carried out in other ways without departure from its spirit.

We claim:

A polyvinyl ester resin composition plasticized with a fatty acid ester selected from the class consisting of: ethylene glycol monobutyl ether epoxy stearate, tetrahydrofurfuryl epoxy stearate, and ethylene glycol monoethyl ether epoxy stearate.

References Cited in the file of this patent

UNITED STATES PATENTS

| | | |
|---|---|---|
| 2,485,160 | Niederhauser et al. | Oct. 18, 1949 |
| 2,559,177 | Terry et al. | July 3, 1951 |
| 2,636,019 | Butler et al. | Apr. 21, 1953 |